(12) United States Patent
Fan

(10) Patent No.: US 11,588,187 B2
(45) Date of Patent: *Feb. 21, 2023

(54) ENHANCED SOLID STATE BATTERY CELL

(71) Applicant: American Lithium Energy Corporation, Carlsbad, CA (US)

(72) Inventor: Jiang Fan, San Diego, CA (US)

(73) Assignee: American Lithium Energy Corporation, Carlsbad, CA (US)

(*) Notice: Subject to any disclaimer, the term of this patent is extended or adjusted under 35 U.S.C. 154(b) by 54 days.

This patent is subject to a terminal disclaimer.

(21) Appl. No.: 17/360,827

(22) Filed: Jun. 28, 2021

(65) Prior Publication Data
US 2021/0328271 A1    Oct. 21, 2021

Related U.S. Application Data

(63) Continuation of application No. 16/548,317, filed on Aug. 22, 2019, now Pat. No. 11,063,305, which is a continuation of application No. 15/610,552, filed on May 31, 2017, now Pat. No. 10,454,142.
(Continued)

(51) Int. Cl.
*H01M 10/42* (2006.01)
*H01M 4/505* (2010.01)
(Continued)

(52) U.S. Cl.
CPC ....... *H01M 10/4235* (2013.01); *H01M 4/505* (2013.01); *H01M 4/525* (2013.01); *H01M 4/582* (2013.01); *H01M 10/056* (2013.01); *H01M 50/446* (2021.01); *H01M 50/46* (2021.01); *H01M 10/052* (2013.01);
(Continued)

(58) Field of Classification Search
CPC .......... H01M 10/4235; H01M 50/466; H01M 50/46; H01M 50/056; H01M 4/505; H01M 4/525; H01M 4/582
See application file for complete search history.

(56) References Cited

U.S. PATENT DOCUMENTS 10,573,926 B1    2/2020   Fan
2002/0055041 A1  5/2002   Kobayashi et al.
(Continued)

OTHER PUBLICATIONS

Aono et al., "Ionic Conductivity of Solid Electrolytes Based on Lithium Titanium Phosphate," Apr. 1990, J. Electrochem. Soc., vol. 137, No. 4, pp. 1023-1027. (Year: 1990).
(Continued)

*Primary Examiner* — Matthew J Merkling
(74) *Attorney, Agent, or Firm* — Mintz Levin Cohn Ferris Glovsky and Popeo, P.C.

(57) ABSTRACT

An enhanced solid state battery cell is disclosed. The battery cell can include a first electrode, a second electrode, and a solid state electrolyte layer interposed between the first electrode and the second electrode. The battery cell can further include a resistive layer interposed between the first electrode and the second electrode. The resistive layer can be electrically conductive in order to regulate an internal current flow within the battery cell. The internal current flow can result from an internal short circuit formed between the first electrode and the second electrode. The internal short circuit can be formed from the solid state electrolyte layer being penetrated by metal dendrites formed at the first electrode and/or the second electrode.

20 Claims, 7 Drawing Sheets

Related U.S. Application Data

(60) Provisional application No. 62/343,683, filed on May 31, 2016.

(51) Int. Cl.
*H01M 4/525* (2010.01)
*H01M 10/056* (2010.01)
*H01M 4/58* (2010.01)
*H01M 50/46* (2021.01)
*H01M 50/446* (2021.01)
*H01M 10/052* (2010.01)
*H01M 10/054* (2010.01)

(52) U.S. Cl.
CPC .. *H01M 10/054* (2013.01); *H01M 2300/0071* (2013.01); *H01M 2300/0082* (2013.01); *H01M 2300/0094* (2013.01)

(56) References Cited

U.S. PATENT DOCUMENTS

| | | |
|---|---|---|
| 2006/0147808 A1 | 7/2006 | Xiao et al. |
| 2007/0122716 A1 | 5/2007 | Seo et al. |
| 2008/0206646 A1 | 8/2008 | Kikuchi et al. |
| 2008/0274411 A1 | 11/2008 | Nakajima et al. |
| 2009/0176147 A1 | 7/2009 | Hatanaka et al. |
| 2011/0003209 A1 | 1/2011 | Katayama et al. |
| 2012/0115030 A1 | 5/2012 | Tanaka et al. |
| 2013/0136981 A1 | 5/2013 | Peuchert et al. |
| 2013/0224557 A1 | 8/2013 | Hayakawa et al. |
| 2013/0224558 A1 | 8/2013 | Kim et al. |
| 2013/0260207 A1 | 10/2013 | Uemura |
| 2014/0186696 A1 | 7/2014 | Onagi et al. |
| 2015/0171398 A1 | 6/2015 | Roumi |
| 2017/0346141 A1 | 11/2017 | Fan |
| 2020/0091563 A1 | 3/2020 | Fan |

OTHER PUBLICATIONS

Minami et al., "Crystallization Process for Superionic Li7P3S11 Glass-Ceramic Electrolytes," 2011, J. Am. Ceram. Soc., 94, pp. 1779-1783. (Year: 2011).

Murugan et al., "Fast Lithium Ion Conduction in Garnet-Type Li7La3Zr2O12," 2007, Angew. Chem. Int. Ed., 46, pp. 7778-7781. (Year: 2007).

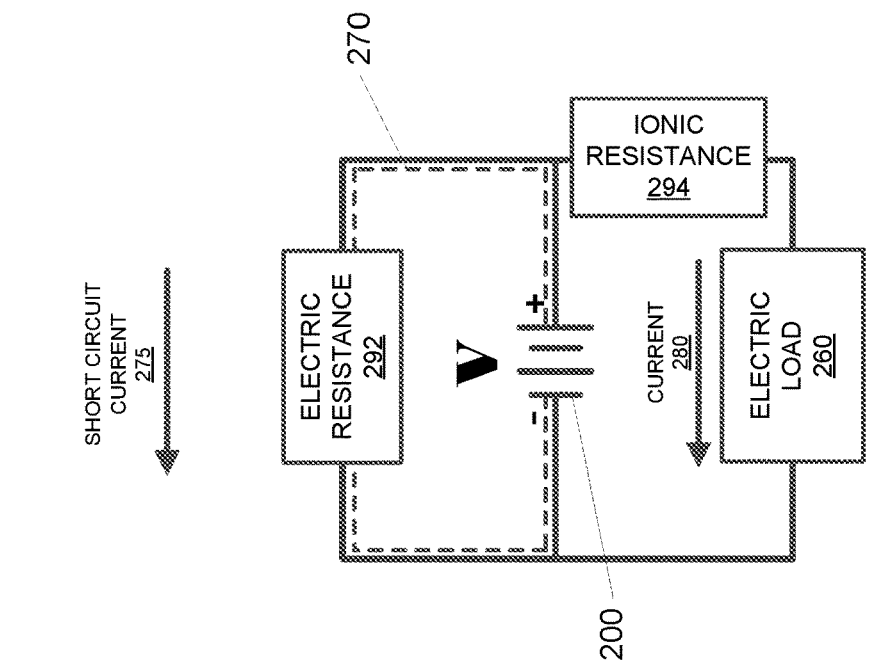
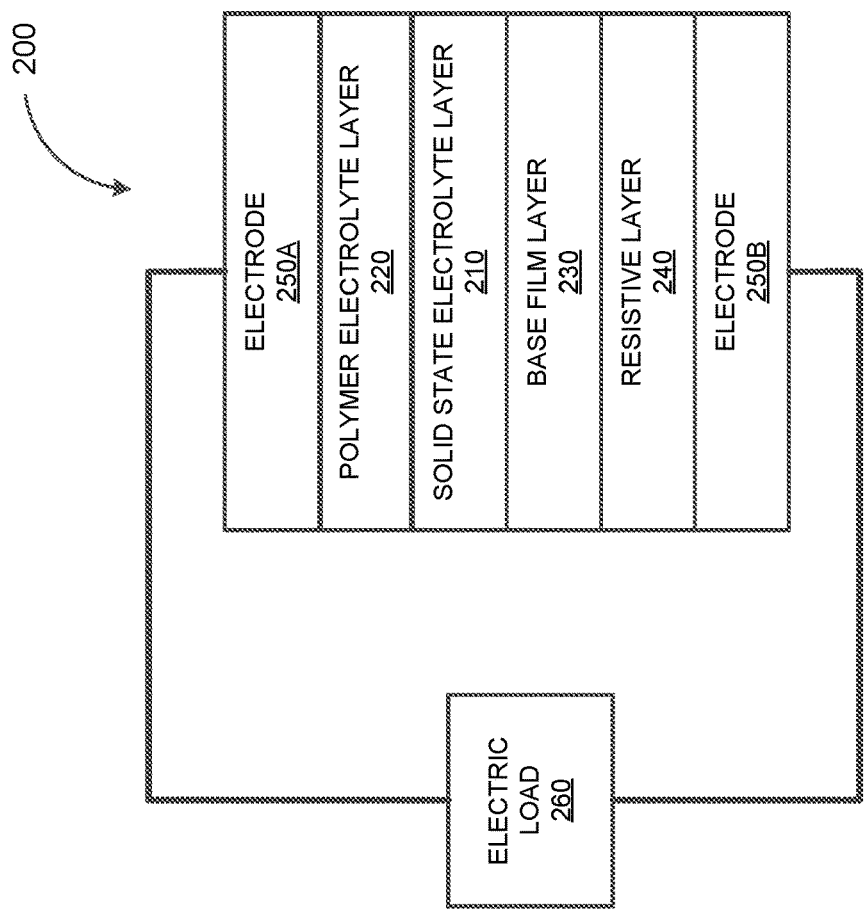
FIG. 2B
FIG. 2A

ENHANCED SOLID STATE BATTERY CELL

RELATED APPLICATIONS

This application is a continuation of application Ser. No. 16/548,317 filed Aug. 22, 2019, now U.S. Pat. No. 11,063,305, entitled "ENHANCED SOLID STATE BATTERY CELL," which is a continuation of application Ser. No. 15/610,552 filed May 31, 2017, now U.S. Pat. No. 10,454,142, entitled "ENHANCED SOLID STATE BATTERY CELL," which claims priority to U.S. Provisional Application No. 62/343,683 filed on May 31, 2016, entitled "MULTI-LAYERED SOLID STATE ELECTROLYTE FILM FOR RECHARGEABLE BATTERIES AND ITS CORRESPONDING MANUFACTURING METHODS". The entire contents of these applications are incorporated herein by reference in their entirety.

TECHNICAL FIELD

The subject matter described herein relates generally to battery technology and more specifically to battery electrolytes.

BACKGROUND

Electrolytes are highly conductive substances that enable the movement of electrically charged ions. For example, electrolytes in a battery can provide a pathway for the transfer of charged particles and/or ions between the anode and the cathode of the battery.

SUMMARY

Systems, methods, and articles of manufacture, including batteries and battery components, are provided. In some implementations of the current subject matter, there is provided a battery cell. The battery cell can include a first electrode, a second electrode, and a solid state electrolyte layer interposed between the first electrode and the second electrode. The battery cell can further include a resistive layer interposed between the first electrode and the second electrode. The resistive layer can be electrically conductive in order to regulate an internal current flow within the battery cell. The internal current flow can result from an internal short circuit formed between the first electrode and the second electrode. The internal short circuit can be formed from the solid state electrolyte layer being penetrated by metal dendrites formed at the first electrode and/or the second electrode.

In some variations, one or more features disclosed herein including the following features can optionally be included in any feasible combination. The resistive layer can further be ionically conductive to enable a transfer of ions between the first electrode and the second electrode.

In some variations, the resistive layer can include one or more electrically conductive materials. The one or more electrically conductive materials can include carbon black, carbon nano tubes, graphene, conductive polymers, and/or conductive inorganic compounds. An amperage of the internal current flow can be proportional to a quantity of the one or more electrically conductive material.

In some variations, the resistive layer can include one or more ionically conductive materials. The one or more ionically conductive materials can include a polymer electrolyte, a polymer gel electrolyte, and/or a solid state electrolyte. A power of the battery cell can be directly proportional to a quantity of the one or more ionically conductive material.

In some variations, the resistive layer can include one or more polymer binders. The one or more polymer binders can include a polyvinylidene fluoride (PVDF), a styrene-butadiene (SBR), a carboxymethyl cellulose (CMC), a polyimide, a polyamide, and/or a polyethylene.

In some variations, the resistive layer can include one or more nano-particle fillers. The one or more nano-particle fillers can include a calcium carbonate ($CaCO_3$), a silicon titanium oxide ($SiTiO_3$), an aluminum oxide ($Al_2O_3$), and/or a fumed silica.

In some variations, the resistive layer can include one or more electrochemically active compounds. The one or more electrochemically active compounds can include lithium nickel cobalt (NCM), lithium iron fluorine oxide ($LiFeFO_2$), iron fluoride ($FeF_x/C$), and/or lithium nickel manganese cobalt oxide (NMC).

In some variations, the resistive layer can be interposed between the solid state electrolyte layer and one of the first electrode and the second electrode. The battery cell can further include a first polymer electrolyte layer. The first polymer electrolyte layer can be interposed between the first electrode and the solid state electrolyte layer. The first polymer electrolyte layer can be configured to reduce a contact impedance between the first electrode and the solid state electrolyte layer. The battery cell can further include a second polymer electrolyte layer. The second polymer electrolyte layer can be interposed between the resistive layer and the second electrode. The battery cell can further include a base film layer. The solid state electrolyte layer can be interposed between the first polymer electrolyte layer and the base film layer. The first polymer electrolyte layer and the base film layer can be configured to prevent a decomposition of the solid state electrolyte layer during a production and/or an operation of the battery cell.

In some variations, the battery cell can be a metal battery. The metal battery can be a lithium (Li) battery, a sodium (Na) battery, and/or a potassium (K) battery. The solid state electrolyte layer can be formed by vapor deposition and/or plasma deposition.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2A depicts a schematic diagram illustrating a battery cell consistent with implementations of the current subject matter;

FIG. 2B depicts a schematic diagram illustrating an internal short circuit consistent with implementations of the current subject matter;

When practical, similar reference numbers denote similar structures, features, or elements.

DESCRIPTION

Metal batteries, such as lithium (Li) batteries, are susceptible to internal shorts, which can lead to hazardous thermal runaway and combustion. For example, the charging and discharging of a metal battery can give rise to metal dendrites. These metal dendrites can penetrate the porous separator between the anode and the cathode of the metal battery, thereby causing an internal short. Solid state electrolytes (SSEs) are not porous and are thought to be less prone to being penetrated by metal dendrites. Nevertheless, metal dendrites may still penetrate the structural defects, such as pinholes and cracks, that are inevitably present in solid state electrolytes. Thus, a metal battery formed with solid state electrolytes may still succumb to an internal short, particularly after the metal battery is subjected to a large number of charge and discharge cycles. As such, in some implementations of the current subject matter, a battery cell having a solid state electrolyte may further include an electrical barrier against internal shorts. For example, this enhanced solid state battery cell can include a resistive layer configured to regulate internal current flow in the event of an internal short caused by a breach of the solid state electrolyte.

Figure 1B:
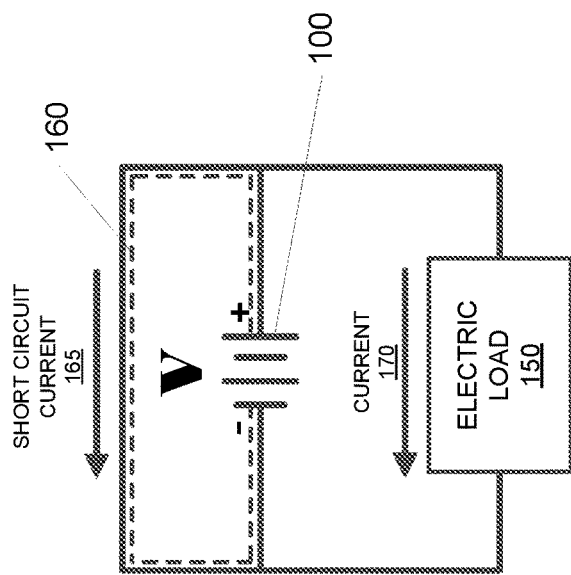
FIG. 1B depicts a schematic diagram illustrating an internal short circuit consistent with implementations of the current subject matter.
Figure 1A:
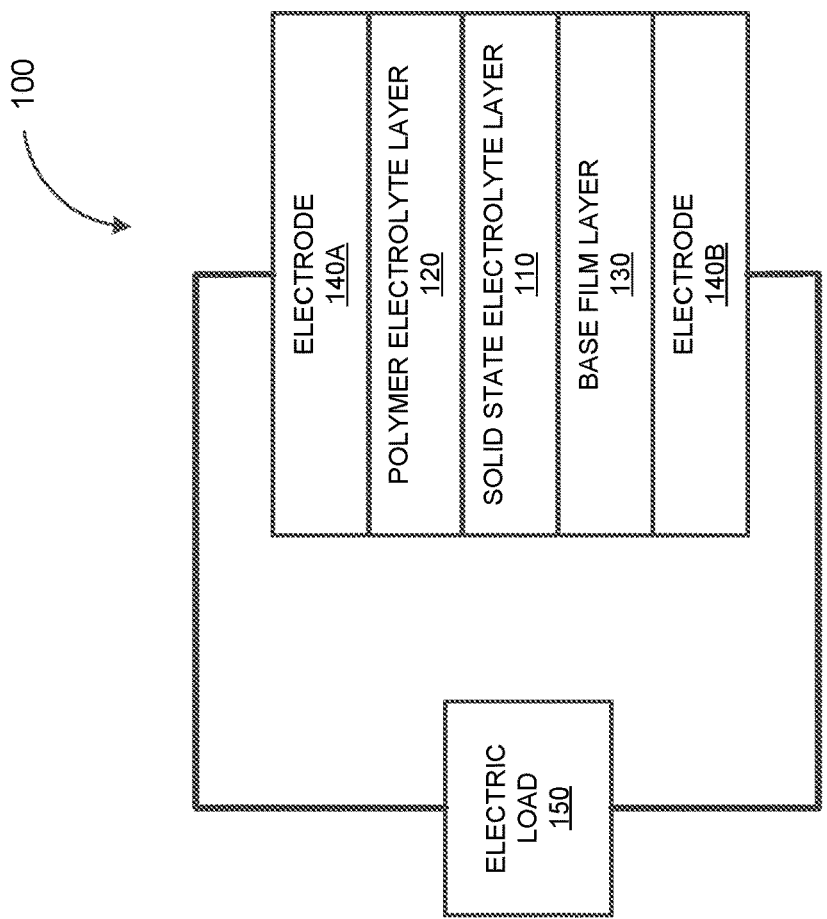
FIG. 1A depicts a schematic diagram illustrating a battery cell consistent with implementations of the current subject matter.

FIG. 1 depicts a schematic diagram illustrating a battery cell 100 consistent with some implementations of the current subject matter. Referring to FIG. 1A, the battery cell 100 can include a solid state electrolyte layer 110, a polymer electrolyte layer 120, a base film layer 130, a first electrode 140A, and a second electrode 140B. In some implementations of the current subject matter, the first electrode 140A can be the negative electrode (e.g., anode) of the battery cell 100. Meanwhile, the second electrode 140B can be the positive electrode (e.g., cathode) of the battery cell 100. However, it should be appreciated that the battery cell 100 can also be configured with an opposite electrical polarity.

The solid state electrolyte layer 110 can be interposed between the polymer electrolyte layer 120 and the base film layer 130. Furthermore, as shown in FIG. 1A, the polymer electrolyte layer 120 can be interposed between the solid state electrolyte layer 110 and the first electrode 140A while the base film layer 130 can be interposed between the solid state electrolyte layer 110 and the second electrode 140B. It should be appreciated that the solid state electrolyte layer 110 may be formed from solid state electrolytes that tend to be fragile and highly reactive. For example, the solid state electrolyte layer 110 can decompose and/or breakdown during production of the battery cell 100 due to reaction with common environmental elements such as water and/or oxygen. The solid state electrolyte layer 110 can also decompose and/or breakdown during operation of the battery cell 100 by reacting with the first electrode 140A and the second electrode 140B of the battery cell 100 upon contact. Thus, in some implementations of the current subject matter, the polymer electrolyte layer 120 and the base film layer 130 can be configured to isolate the solid state electrolyte layer 110 from environmental elements as well as both the first electrode 140A and the second electrode 140B, thereby preventing a decomposition and/or breakdown of the solid state electrolyte layer 110 during both the production and operation of the battery cell 100. Furthermore, the polymer electrolyte layer 120 and/or the base film layer 130 can also mitigate the high contact impedance between the solid state electrolyte layer 110 and the first electrode 140A and/or between the first solid state electrolyte layer 110 and the second electrode 140B.

As noted earlier, the solid state electrolyte layer 110 can include physical defects (e.g., pinholes, cracks) that render the solid state electrolyte layer 110 susceptible to being penetrated by metal dendrites, especially after the battery cell 100 is subjected to a large number of charge and discharge cycles. For example, metal dendrites forming on the first electrode 140A and/or the second electrode 140B can penetrate the solid state electrolyte layer 110, the polymer electrolyte layer 120, and the base film layer 130 to form an internal short circuit 160 between the first electrode 140A and the second electrode 140B. FIG. 1B depicts a schematic diagram illustrating the internal short circuit 160 consistent with some implementations of the current subject matter. This internal short circuit 160 provides an alternative path that is less resistive than a path through an electric load 150 of the battery cell 170. Thus, the bulk of the current 170 is diverted from the electric load 150 to the internal short circuit 160. The resulting short circuit current 165 flowing through the battery cell 100 (e.g., from the second electrode 140B to the first electrode 140A) can be much greater than the current 170 still flowing through the electric load 150. This short circuit current 165 can generate a large quantity of heat (e.g., thermal runaway) within the battery cell 100 that can lead to combustion of the battery cell 100. No existing mechanisms are available to mitigate the effects of the internal short circuit 160 caused by the penetration of the solid state electrolyte layer 110.

FIG. 2A depicts a schematic diagram illustrating a battery cell 200 consistent with implementations of the current subject matter. Referring to FIG. 2A, the battery cell 200 can include a solid state electrolyte layer 210, a polymer electrolyte layer 220, a base film layer 230, a resistive layer 240, a first electrode 250A, and a second electrode 250B. In some implementations of the current subject matter, the first electrode 250A can be the negative electrode (e.g., anode) of the battery cell 200. Meanwhile, the second electrode 250B can be the positive electrode (e.g., cathode) of the battery cell 200.

The solid state electrolyte layer 210 can be interposed between the polymer electrolyte layer 220 and the base film layer 230 and/or the resistive layer 240. For example, as shown in FIG. 2A, the solid state electrolyte layer 210 can be interposed between the polymer electrolyte layer 220 and the base film layer 230 while the polymer electrolyte layer 220 is interposed between the first electrode 250A and the solid state electrolyte layer 210. Furthermore, the polymer electrolyte layer 220 can be interposed between the solid state electrolyte layer 210 and the first electrode 250A. Meanwhile the base film layer 230 and/or the resistive layer 240 can be interposed between the solid state electrolyte layer 210 and the second electrode 250B. However, it should be appreciated that the base film layer 230 can be optional. In the absence of the base film layer 230, the solid state electrolyte layer 210 can also be interposed directly between the polymer electrolyte layer 220 and the resistive layer 240. Furthermore, the positions of the various layers of the battery cell 200 shown in FIG. 2A are interchangeable. For example, the respective positions of the polymer electrolyte layer 220 and the base film layer 230 can be swapped such that the base film layer 230 is interposed between the first electrode 250A and the solid state electrolyte layer 210 instead of the polymer electrolyte layer 220. Alternately and/or additionally, the respective positions of the base film layer 230 and the resistive layer 240 can be swapped such that the base film layer 230 is interposed between the resistive layer 240 and the second electrode 250B instead of the resistive layer 240 being interposed between the base layer 230 and the second electrode 250B.

It should be appreciated that the solid state electrolyte layer 210 may be formed from solid state electrolytes that tend to be fragile and highly reactive. For example, the solid state electrolyte layer 210 can decompose and/or breakdown during production of the battery cell 200 due to reaction with common environmental elements such as water and/or oxygen. The solid state electrolyte layer 210 can also decompose and/or breakdown during operation of the battery cell 200 by reacting with the first electrode 250A and the second electrode 250B of the battery cell 200 upon contact. Thus, in some implementations of the current subject matter, the polymer electrolyte layer 220, the base film layer 230, and/or the resistive layer 240 can be configured to isolate the solid state electrolyte layer 210 from environmental elements as well as both the first electrode 250A and the second electrode 250B, thereby preventing a decomposition and/or breakdown of the solid state electrolyte layer 210 during both the production and operation of the battery cell 200. Furthermore, the polymer electrolyte layer 220, the base film layer 230, and/or the resistive layer 240 can also mitigate the high contact impedance between the solid state electrolyte layer 210 and the electrode 250A and/or between the first solid state electrolyte layer 210 and the second electrode 250B.

As noted earlier, the solid state electrolyte layer 210 can include physical defects (e.g., pinholes, cracks) that render the solid state electrolyte layer 210 susceptible to being penetrated by metal dendrites, especially after the battery cell 200 is subjected to a large number of charge and discharge cycles. For example, metal dendrites forming on the first electrode 250A and/or the second electrode 250B can penetrate the solid state electrolyte layer 210, the polymer electrolyte layer 220, the base film layer 230, and the resistive layer 240 to form an internal short circuit 270 between the first electrode 250A and the second electrode 250B.

FIG. 2B depicts a schematic diagram illustrating the internal short circuit 270 consistent with implementations of the current subject matter. According to some implementations of the current subject matter, the resistive layer 240 can be configured to regulate a short circuit current 275 between the second electrode 250B and the first electrode 250A, in the event of a breach of the solid state electrolyte layer 210 and the formation of the internal short circuit 20. The resistive layer 240 can be ionically conductive, electrically conductive, and/or electrochemically active. The short circuit current 275 that results from the internal short circuit 270 within the battery cell 200 can be controlled via the electrical conductivity and/or electrochemical activity of the resistive layer 240. As shown in FIG. 2B, the resistive layer 240 can provide an electric resistance 292. A rate (e.g., amperage) of the short circuit current 275 can be dependent upon the electric resistance 292, which may be directly proportional to a quantity of electrically conductive material and/or electrochemically active material in the resistive layer 240. Meanwhile, the resistive layer 240 will not interfere with the normal operation of the battery cell 200 because the resistive layer 240 is ionically conductive and/or electrochemically active, and will therefore not impede the transfer of charged particles and/or ions between the first electrode 250A and the second electrode 250B. However, it should be appreciated that the resistive layer 240 can impose some ionic resistance 294. Thus, the power of the battery cell 200 can be dependent upon the ionic conductivity and/or the electrochemical activity of the resistive layer 240. For instance, the power of the battery cell 200 can be directly proportional to a quantity of ionically conductive material and/or electrochemically active in the resistive layer 240.

In some implementations of the current subject matter, the resistive layer 240 can be formed from a polymer binder such as, for example, polyvinylidene fluoride (PVDF), styrene-butadiene (SBR), carboxymethyl cellulose (CMC), polyimide, polyamide, polyethylene, and/or the like. The resistive layer 240 can include one or more electrically conductive additives such as, for example, carbon black, carbon nano tubes, graphene, a conductive polymer, a conductive inorganic compound, and/or the like. The resistive layer 240 can further include one or more ionically conductive additives such as, for example, a polymer electrolyte, a polymer gel electrolyte, a solid state electrolyte, and/or the like. Alternately and/or additionally, the resistive layer 240 can include nano-particle fillers such as, for example, calcium carbonate ($CaCO_3$), silicon titanium oxide ($SiTiO_3$), aluminum oxide ($Al_2O_3$), fumed silica, and/or the like. The resistive layer 240 can also be formed from one or more electrochemically active materials (e.g., lithium nickel cobalt (NCM), lithium iron fluorine oxide ($LiFeFO_2$), lithium nickel manganese cobalt oxide (NMC), iron fluoride ($FeF_x$/C)) and/or compounds having a negative thermal expansion coefficient. It should be appreciated that the resistive layer 240 can have a thickness between 0.1 to 30 microns (μm) or preferably between 1 to 10 microns. Furthermore, heat generated from electrochemical activity within the resistive layer 240 can provide an indication of the presence of the internal short circuit 270 and/or trigger one or more safety mechanisms.

It should be appreciated that the battery cell 200 can be any type of metal battery including, for example, a lithium (Li) battery, a sodium (Na) battery, a potassium (K) battery, and/or the like. The first electrode 240A and/or the second electrode 240B of the battery cell 200 can be formed from any material. For instance, the positive second electrode 240B can be formed from lithium nickel cobalt (NCM), lithium iron fluorine oxide ($LiFeFO_2$), lithium nickel manganese cobalt oxide (NMC), and/or the like. The solid state electrolyte layer 210 can be formed from one or more type of solid state electrolytes including, for example, sulfide-based solid state electrolytes (e.g., $Li_2S$—$SiS_2$—$P_2S_5$, $Li_7P_3S_{11}$, $Li_{4.34}Ge_{0.73}Ga_{0.24}S_4$), garnet-type lithium ion-conducting oxides (e.g., $Li_{5+x}La_3(Zr_x, A_{2-x})O_{12}$ where $1.4<x<2$), ceramic ion conductors (e.g., LISICON) containing the frame work structure $SiO_4$, $PO_4$, and $ZnO_4$, and/or the like. Meanwhile, the base film layer 230 can be formed from any combinations of one or more solid state electrolytes, silicon oxides, alumina oxides, lithium salts, organic binders, inorganic binders, and/or the like. The base film layer 230 can be a separator or any combination of separators including, for example, a polyethylene separator (e.g., Asahi® D420), a tri-layer polyolefin separator (e.g., Celgard® 2300), a fiber separator, a non-woven fabric separator, a glass fiber separator, a ceramic separator, and/or the like.

In some implementations of the current subject matter, the polymer electrolyte layer 220 can be formed a polymers and/or a polymer composite. For example, the polymer electrolyte layer 220 can be formed from a crosslinked polymer (e.g., containing crosslinking agents such as polyethylene oxide, poly-(bis((methoxyethoxy)ethoxy)phosphazene) (MEEP), single ionic conductor (e.g., lithium (Li) replaced Nafion®), polyhedral oligomeric silsesquioxane (POSS), carboxymethyl cellulose (CMC), methacrylate, and/or the like), a non-crosslinked polymer, a stiff polymer (e.g., polyamide imide (PAI)), a block polymer, a composite of different polymers, and/or the like. Alternately and/or additionally, the protective layer 120 may be formed from a composite of one or more polymers and at least one additive including, for example, conductive and/or nonconductive ceramic particles, lithium salt particles (e.g., lithium fluoroborate ($LiBF_4$ and/or $LiPF_6$), lithium nitrate ($LiNO_3$), lithium bis(fluorosulfonyl)imide, lithium bis(perfluoroethanesulfonyl)imide), lithium metal stabilizers (e.g., vinyl carbonate), ether solvents, and/or the like.

Figure 3:
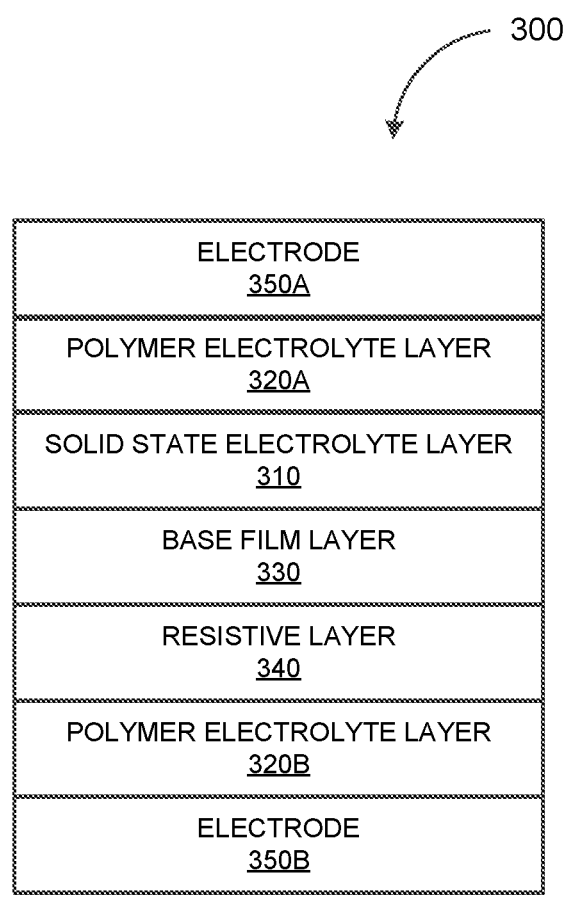
FIG. 3 depicts a schematic diagram illustrating a battery cell consistent with implementations of the current subject matter.

FIG. 3 depicts a schematic diagram illustrating a battery cell 300 consistent with some implementations of the current subject matter. Referring to FIG. 3, the battery cell 300 can include a first electrode 350A, a second electrode 350B, a solid state electrolyte layer 310, a base film layer 330, and a resistive layer 340. The first electrode 350A can be the negative electrode (e.g., anode) of the battery cell 300 while the second electrode 350B can be the positive electrode (e.g., cathode) of the battery cell 300. However, it should be appreciated that the battery cell 300 can also be configured with an opposite electrical polarity.

In some implementations of the current subject matter, the battery cell 300 can include more than one polymer electrolyte layers configured to mitigate the high contact impedance with respect to the first electrode 350A and/or the second electrode 350B. For example, the battery cell 300 can include a first polymer electrolyte layer 320A that is interposed between the first electrode 350A and the solid state electrolyte layer 310. The battery cell 300 can also include a second polymer electrolyte layer 320B that is interposed between the second electrode 350B and the resistive layer 340. It should be appreciated that one or both of the first polymer electrolyte 320A and the second polymer electrolyte 320B may be optional.

In some implementations of the current subject matter, the resistive layer 340 can be configured to regulate a short circuit current flowing through the battery cell 300 in the event that metal dendrites formed at the first electrode 350A and/or the second electrode 350B penetrates the first polymer electrolyte layer 320A, the second polymer electrolyte layer 320B, the solid state electrolyte layer 310, and the base film layer 330 to form an internal short circuit within the battery cell 300. The resistive layer 340 can be formed from one or more materials that are ionically conductive, electrically conductive, and/or electrochemically active. As such, the short circuit current resulting from the internal short circuit within the battery cell 300 can be controlled by the electrically conductive and/or electrochemically active material within the resistive layer 340. Meanwhile, the resistive layer 340 will not interfere with the normal operation of the battery cell 300 because the resistive layer 340 is ionically conductive and/or electrochemically active, and will therefore not impede the transfer of charged particles and/or ions between the first electrode 350A and the second electrode 350B. However, it should be appreciated that the resistive layer 340 can impose some ionic resistance. Therefore, the power of the battery cell 300 can be dependent upon the ionic conductivity of the resistive layer 340 including, for example, the ionically conductive and/or electrochemically active material within the resistive layer 340.

Figure 4:
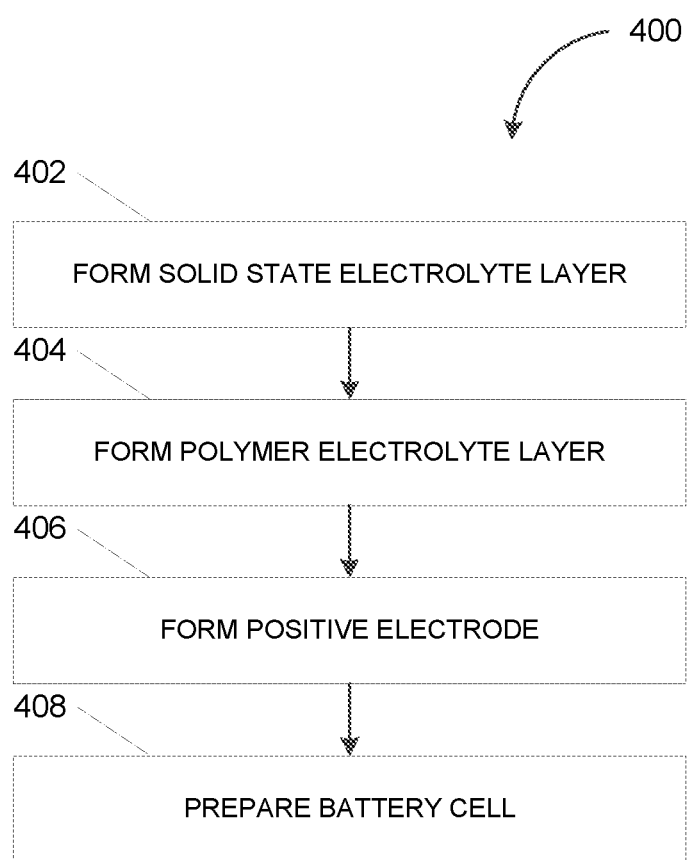
FIG. 4 depicts a flowchart illustrating a process for manufacturing a battery cell consistent with implementations of the current subject matter.

FIG. 4 depicts a flowchart illustrating a process 400 for manufacturing a battery cell consistent with implementations of the current subject matter. Referring to FIGS. 1A-B and 4, the process 400 can be performed to manufacture a battery cell such as, for example, the battery cell 100.

At 402, a solid state electrolyte layer can be formed. For example, the solid state electrolyte layer 110 of the battery cell 100 can be formed, for example, by vapor deposition and/or plasma deposition. In some implementations of the subject matter, forming the solid state electrolyte layer 110 can include dissolving, using a high speed mixer, 5 grams of polyethylene oxide (PEO) with 1,000,000 molecular weight into approximately 100 grams of deionized water, thereby forming a polyethylene oxide aqueous solution. Furthermore, 1 gram of lithium nitrate can be mixed into the polyethylene oxide aqueous solution followed by 20 grams of $Li_7La_3Zr_2O_{12}$ (LLZO). The resulting slurry can be coated onto the base film layer 130. The base film layer 130 can be a separator such as, for example, Celgard® 2300 and/or the like. Here, an automatic coating machine can be used to deposit an approximately 20 microns thick coating of the slurry onto the separator at 0.1 meter per minute. The coating of slurry can further be dried using the automatic coating machine with a first heating zone set to 60° C. and a second heating zone set to 80° C.

At 404, a polymer electrolyte layer can be formed. For example, the polymer electrolyte layer 120 of the battery cell 100 can be formed. In some implementations of the current subject matter, forming the polymer electrolyte layer 120 can include dissolving, using a high speed mixer, 5 grams of polyethylene oxide (PEO) with 500,000 molecular weight into approximately 50 grams of deionized water, thereby forming a polyethylene oxide aqueous solution. Furthermore, 1 gram of lithium nitrate can be mixed into the polyethylene oxide aqueous solution. The solution can be coated onto the solid state electrolyte layer 110 formed at operation 402. For instance, the coating can be performed using an automatic coating machine at 0.1 meter per minute. The coating can further be dried using the automatic coating machine with a first heating zone set to 60° C. and a second heating zone set to 80° C. It should be appreciated that the resulting polymer electrolyte layer 120 will interface directly with the negative first electrode 140A (e.g., anode) of the battery cell 100.

At 406, a positive electrode can be formed. For example, the second electrode 140B of the battery cell 100 can be formed. In some implementations of the current subject matter, forming the second electrode 140B can include dissolving 10.5 grams of polyvinylidene fluoride (PVDF) into 120 grams of N-methylpyrrolidone (NMP). Furthermore, 9 grams of carbon black can be added to the mixture and mixed for 15 minutes at 6500 revolutions per minute (rpm). A flowable slurry can subsequently be formed by adding 280 grams of $LiNi_{0.5}Mn_{0.3}Co_{0.2}O_2$ (NMC) (280 g) to the mixture and mixing for 30 minutes at 6500 revolutions per minute. Additional N-methylpyrrolidone (NMP) can be added to adjust the viscosity of the slurry. The resulting slurry can be coated onto a 15 micron thick layer of aluminum foil using an automatic coating machine. The coating of slurry can further be dried using the automatic coating machine with a first heat zone set to approximately 80° C. and a second heat zone set to approximately 130° C. It should be appreciated that subjecting the slurry to heat can evaporate the N-methylpyrrolidone (NMP) in the slurry. The final dried second electrode 140B can have a loading of approximately 15.55 milligrams per square centimeter (mg/cm$^2$). The second electrode 140B can further be compressed to a thickness of approximately 117 microns.

At 408, a battery cell can be prepared. For example, the battery cell 100 can be formed. In some implementations of the current subject matter, forming the battery cell 100 can include using an electrode tab to punch out the pieces forming the first electrode 140A and/or the second electrode 140B. The second electrode 140B (e.g., positive electrode) can be dried at 125° C. for 10 hours. Furthermore, the first electrode 140A and the second electrode 140B can be laminated, in a dry room, with the solid state electrolyte layer 110 interposed between the first electrode 140A, the polymer electrolyte layer 120, the base film layer 130, and the second electrode 140B. It should be appreciated that in the resulting jelly-flat, the polymer electrolyte layer 120 will directly interface with the first electrode 140A while the base film layer 130 will interface directly with the second electrode 140B. This jelly-flat can be inserted into an aluminum (Al) composite bag, which is subsequently filled with a limited quantity of a liquid electrolyte such as, for example, a LiPF$_6$ based organic carbonate electrolyte. The aluminum composite bag can be sealed at 190° C. to form the battery cell 100. The battery cell 100 can be aged at 45° C. for 5 hours before being subject to an initial charge and discharge cycle. For instance, the sealed battery cell 100 can be first charged to 4.2V at a C/20 rate for 5 hours and then to 4.2V at 0.2 C rate for 5 hours before the battery cell 100 is rested for 20 minutes. The rested battery cell 100 can subsequently be discharged to 2.8V at 0.2 C rate. In addition, the battery cell 100 can be punctured, while under vacuum, to release any gases before the battery cell 100 is resealed. At this point, the battery cell 100 is ready for operation and/or evaluation.

Figure 5:
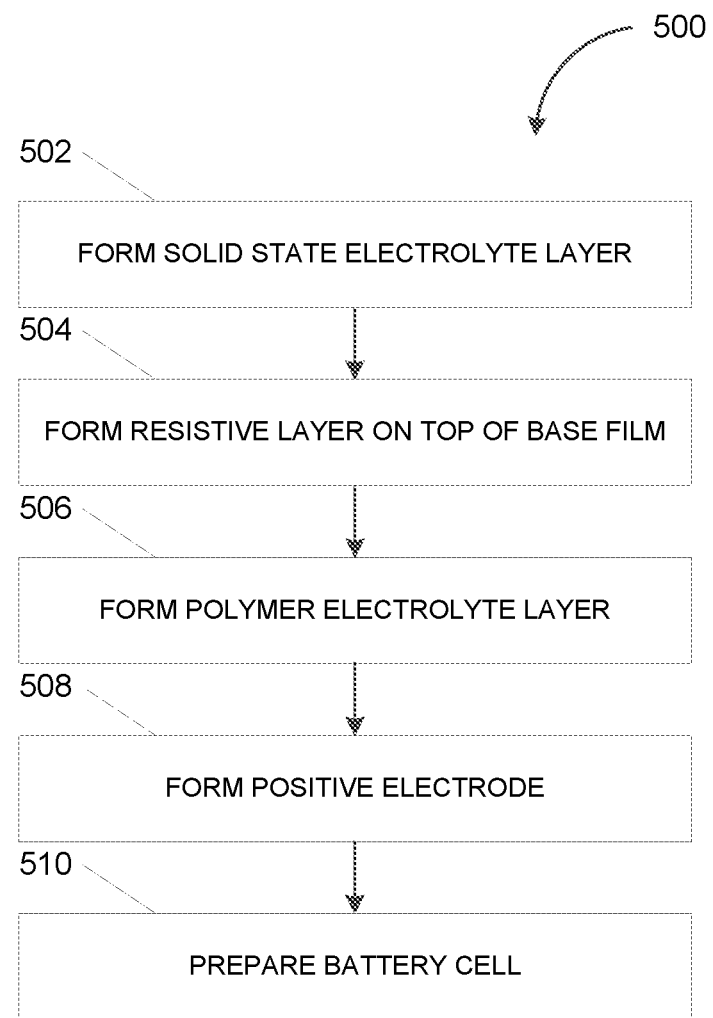
FIG. 5 depicts a flowchart illustrating a process for manufacturing a battery cell consistent with implementations of the current subject matter.

FIG. 5 depicts a flowchart illustrating a process 500 for manufacturing a battery cell consistent with implementations of the current subject matter. Referring to FIGS. 2A-B and 5, the process 500 can be performed to manufacture a battery cell such as, for example, the battery cell 200.

At 502, a solid state electrolyte layer can be formed. For example, the solid state electrolyte layer 210 of the battery cell 200 can be formed, for example, by vapor deposition and/or plasma deposition. In some implementations of the subject matter, forming the solid state electrolyte layer 110 can include dissolving, using a high speed mixer, 5 grams of polyethylene oxide (PEO) with 1,000,000 molecular weight into approximately 100 grams of deionized water, thereby forming a polyethylene oxide aqueous solution. Furthermore, 1 gram of lithium nitrate can be mixed into the polyethylene oxide aqueous solution followed by 20 grams of Li$_7$La$_3$Zr$_2$O$_{12}$ (LLZO). The resulting slurry can be coated onto the base film layer 230. The base film layer 230 can be a separator such as, for example, Celgard® 2300 and/or the like. Here, an automatic coating machine can be used to deposit an approximately 20 microns thick coating of the slurry onto the separator at 0.1 meter per minute. The coating of slurry can further be dried using the automatic coating machine with a first heating zone set to 60° C. and a second heating zone set to 80° C.

At 504, a resistive layer can be formed on top of a base film. For example, the resistive layer 240 can be formed on top of the base film layer 230. In some implementations of the current subject matter, forming the resistive layer 240 can include dissolving 10 grams of polyvinylidene fluoride (PVDF) LBG-1 into 100 grams of acetone and 20 grams of N-methylpyrrolidone (NMP). Furthermore, 0.5 grams of carbon black can be added to the mixture and mixed for 15 minutes at 6500 revolutions per minute. A flowable slurry can be formed by adding 1 grams of a lithium salt (e.g., lithium imide) and mixing for 30 minutes at 6500 revolutions per minute. Additional N-methylpyrrolidone (NMP) may be added to adjust the viscosity of the flowable slurry. This resulting slurry can be coated, using an automatic coating machine, onto one side of the base film layer 230 (e.g., Celgard® 2300) with the solid state electrolyte layer 210 being disposed on the opposite side of the base film layer 230. The automatic coating machine can further be used to dry the slurry with a first heat zone set to approximately 60° C. and a second heat zone set to approximately 80° C. It should be appreciated that the slurry is subjected to heat in order to evaporate off the acetone and the N-methylpyrrolidone (NMP) in the slurry. The final dried resistive layer 240 can have a loading of approximately 2 milligrams per square centimeter.

At 506, a polymer electrolyte layer can be formed. For example, the polymer electrolyte layer 220 of the battery cell 200 can be formed. In some implementations of the current subject matter, forming the polymer electrolyte layer 220 can include dissolving, using a high speed mixer, 5 grams of polyethylene oxide (PEO) with 500,000 molecular weight into approximately 50 grams of deionized water, thereby forming a polyethylene oxide aqueous solution. Furthermore, 1 gram of lithium nitrate can be mixed into the polyethylene oxide aqueous solution. The solution can be coated onto the solid state electrolyte layer 210 formed at operation 502. For instance, the coating can be performed using an automatic coating machine at 0.1 meter per minute. The coating can further be dried using the automatic coating machine with a first heating zone set to 60° C. and a second heating zone set to 80° C. It should be appreciated that the resulting polymer electrolyte layer 220 will interface directly with the negative first electrode 250A (e.g., anode) of the battery cell 200.

At 508, a positive electrode can be formed. For example, the second electrode 250B of the battery cell 200 can be formed. In some implementations of the current subject matter, forming the second electrode 250B can include dissolving 10.5 grams of polyvinylidene fluoride (PVDF) into 120 grams of N-methylpyrrolidone (NMP). Furthermore, 9 grams of carbon black can be added to the mixture and mixed for 15 minutes at 6500 revolutions per minute (rpm). A flowable slurry can subsequently be formed by adding 280 grams of LiNi$_{0.5}$Mn$_{0.3}$Co$_{0.2}$O$_2$ (NMC) (280 g) to the mixture and mixing for 30 minutes at 6500 revolutions per minute. Additional N-methylpyrrolidone (NMP) can be added to adjust the viscosity of the slurry. The resulting slurry can be coated onto a 15 micron thick layer of aluminum foil using an automatic coating machine. This coating of slurry can further be dried using the automatic coating machine with a first heat zone set to approximately 80° C. and a second heat zone set to approximately 130° C. It should be appreciated that subjecting the slurry to heat can evaporate the N-methylpyrrolidone (NMP) in the slurry. The final dried second electrode 250B can have a loading of approximately 15.55 milligrams per square centimeter (mg/ cm²). The second electrode 250B can further be compressed to a thickness of approximately 117 microns.

At 510, a battery cell can be prepared. For example, the battery cell 200 can be formed. In some implementations of the current subject matter, forming the battery cell 200 can include using an electrode tab to punch out the pieces forming the first electrode 250A and/or the second electrode 250B. The second electrode 250B (e.g., positive electrode) can be dried at 125° C. for 10 hours. Furthermore, the first electrode 250A and the second electrode 250B can be laminated, in a dry room, with the solid state electrolyte layer 210 interposed between the first electrode 250A, the polymer electrolyte layer 220, the base film layer 230, the resistive layer 240, and the second electrode 250B. It should be appreciated that in the resulting jelly-flat, the polymer electrolyte layer 220 will directly interface with the first electrode 250A while the resistive layer 240 will interface directly with the second electrode 250B. This jelly-flat can be inserted into an aluminum (Al) composite bag, which is subsequently filled with a limited quantity of a liquid electrolyte such as, for example, a $LiPF_6$ based organic carbonate electrolyte. The aluminum composite bag can be sealed at 190° C. to form the battery cell 200. The battery cell 200 can be aged at 45° C. for 5 hours before being subject to an initial charge and discharge cycle. For instance, the sealed battery cell 200 can be first charged to 4.2V at a C/20 rate for 5 hours and then to 4.2V at 0.2 C rate for 5 hours before the battery cell 200 is rested for 20 minutes. The rested battery cell 200 can subsequently be discharged to 2.8V at 0.2 C rate. In addition, the battery cell 200 can be punctured, while under vacuum, to release any gases before the battery cell 200 is resealed. At this point, the battery cell 200 is ready for operation and/or evaluation.

Figure 6:
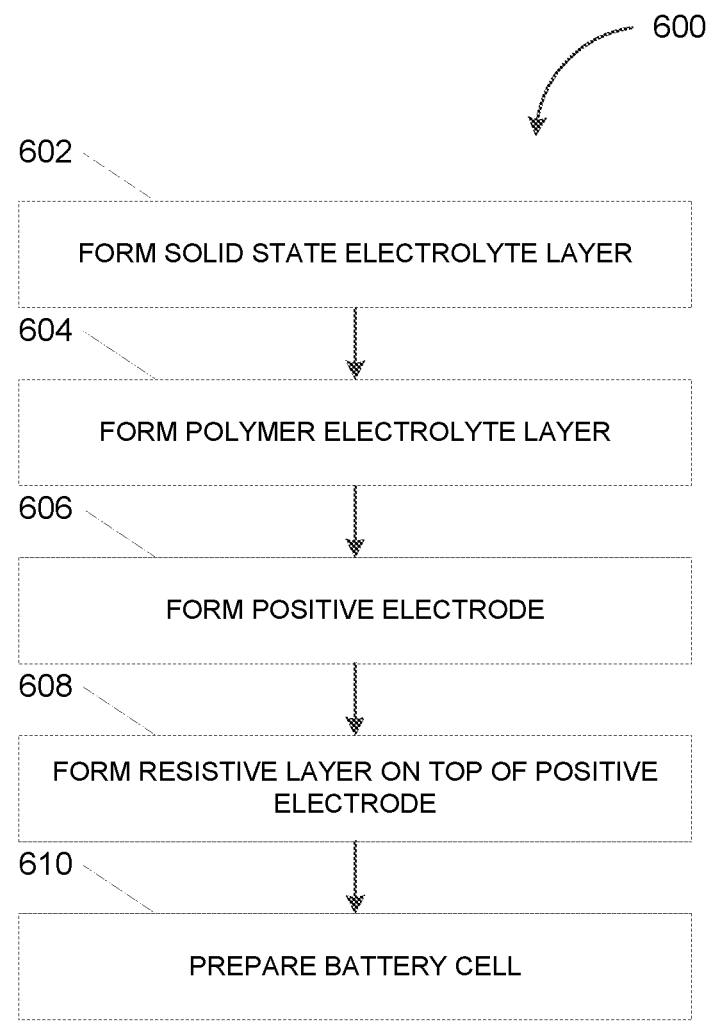
FIG. 6 depicts a flowchart illustrating a process for manufacturing a battery cell consistent with implementations of the current subject matter.

FIG. 6 depicts a flowchart illustrating a process 600 for manufacturing a battery cell consistent with implementations of the current subject matter. Referring to FIGS. 2A-B and 6, the process 600 can be performed to manufacture a battery cell such as, for example, the battery cell 200.

At 602, a solid state electrolyte layer can be formed. For example, the solid state electrolyte layer 210 of the battery cell 200 can be formed, for example, by vapor deposition and/or plasma deposition. In some implementations of the subject matter, forming the solid state electrolyte layer 110 can include dissolving, using a high speed mixer, 5 grams of polyethylene oxide (PEO) with 1,000,000 molecular weight into approximately 100 grams of deionized water, thereby forming a polyethylene oxide aqueous solution. Furthermore, 1 gram of lithium nitrate can be mixed into the polyethylene oxide aqueous solution followed by 20 grams of $Li_7La_3Zr_2O_{12}$ (LLZO). The resulting slurry can be coated onto the base film layer 230. The base film layer 230 can be a separator such as, for example, Celgard® 2300 and/or the like. Here, an automatic coating machine can be used to deposit an approximately 20 microns thick coating of the slurry onto the separator at 0.1 meter per minute. The coating of slurry can further be dried using the automatic coating machine with a first heating zone set to 60° C. and a second heating zone set to 80° C.

At 604, a polymer electrolyte layer can be formed. For example, the polymer electrolyte layer 220 of the battery cell 200 can be formed. In some implementations of the current subject matter, forming the polymer electrolyte layer 220 can include dissolving, using a high speed mixer, 5 grams of polyethylene oxide (PEO) with 500,000 molecular weight into approximately 50 grams of deionized water, thereby forming a polyethylene oxide aqueous solution. Furthermore, 1 gram of lithium nitrate can be mixed into the polyethylene oxide aqueous solution. The solution can be coated onto the solid state electrolyte layer 210 formed at operation 502. For instance, the coating can be performed using an automatic coating machine at 0.1 meter per minute. The coating can further be dried using the automatic coating machine with a first heating zone set to 60° C. and a second heating zone set to 80° C. It should be appreciated that the resulting polymer electrolyte layer 220 will interface directly with the negative first electrode 250A (e.g., anode) of the battery cell 200.

At 606, a positive electrode can be formed. For example, the second electrode 250B of the battery cell 200 can be formed. In some implementations of the current subject matter, forming the second electrode 250B can include dissolving 10.5 grams of polyvinylidene fluoride (PVDF) into 120 grams of N-methylpyrrolidone (NMP). Furthermore, 9 grams of carbon black can be added to the mixture and mixed for 15 minutes at 6500 revolutions per minute (rpm). A flowable slurry can subsequently be formed by adding 280 grams of $LiNi_{0.5}Mn_{0.3}Co_{0.2}O_2$ (NMC) (280 g) to the mixture and mixing for 30 minutes at 6500 revolutions per minute. Additional N-methylpyrrolidone (NMP) can be added to adjust the viscosity of the slurry. The resulting slurry can be coated onto a 15 micron thick layer of aluminum foil using an automatic coating machine. This coating of slurry can further be dried using the automatic coating machine with a first heat zone set to approximately 80° C. and a second heat zone set to approximately 130° C. It should be appreciated that subjecting the slurry to heat can evaporate the N-methylpyrrolidone (NMP) in the slurry. The final dried second electrode 250B can have a loading of approximately 15.55 milligrams per square centimeter (mg/cm²). The second electrode 250B can further be compressed to a thickness of approximately 117 microns.

At 608, a resistive layer can be formed on top of the positive electrode. For example, the resistive layer 240 can be formed on top of the positive second electrode 250B instead of the base film layer 230 as in process 500. In some implementations of the current subject matter, forming the resistive layer 240 can include dissolving 10 grams of polyvinylidene fluoride (PVDF) LBG-1 into 100 grams of acetone and 20 grams of N-methylpyrrolidone (NMP). Furthermore, 0.5 grams of carbon black can be added to the mixture and mixed for 15 minutes at 6500 revolutions per minute. A flowable slurry can be formed by adding 1 grams of a lithium salt (e.g., lithium imide) and mixing for 30 minutes at 6500 revolutions per minute. Additional N-methylpyrrolidone (NMP) may be added to adjust the viscosity of the flowable slurry. This resulting slurry can be coated, using an automatic coating machine, onto one side of the second electrode 250B (e.g., Celgard® 2300) formed at operation 606. The automatic coating machine can further be used to dry this coating of slurry with a first heat zone set to approximately 60° C. and a second heat zone set to approximately 80° C. It should be appreciated that the slurry is subjected to heat in order to evaporate off the acetone and the N-methylpyrrolidone (NMP) in the slurry. The final dried resistive layer 240 can have a loading of approximately 2 milligrams per square centimeter.

At 610, a battery cell can be prepared. For example, the battery cell 200 can be formed. In some implementations of the current subject matter, forming the battery cell 200 can include using an electrode tab to punch out the pieces forming the first electrode 250A and/or the second electrode 250B. The second electrode 250B (e.g., positive electrode) can be dried at 125° C. for 10 hours. Furthermore, the first electrode 250A and the second electrode 250B can be laminated, in a dry room, with the solid state electrolyte layer 210 interposed between the first electrode 250A, the polymer electrolyte layer 220, the base film layer 230, the resistive layer 240, and the second electrode 240B. It should be appreciated that in the resulting jelly-flat, the polymer electrolyte layer 220 will directly interface with the first electrode 250A while the resistive layer 240 will interface directly with the second electrode 250B. This jelly-flat can be inserted into an aluminum (Al) composite bag, which is subsequently filled with a limited quantity of a liquid electrolyte such as, for example, a $LiPF_6$ based organic carbonate electrolyte. The aluminum composite bag can be sealed at 190° C. to form the battery cell 200. The battery cell 200 can be aged at 45° C. for 5 hours before being subject to an initial charge and discharge cycle. For instance, the sealed battery cell 200 can be first charged to 4.2V at a C/20 rate for 5 hours and then to 4.2V at 0.2 C rate for 5 hours before the battery cell 200 is rested for 20 minutes. The rested battery cell 200 can subsequently be discharged to 2.8V at 0.2 C rate. In addition, the battery cell 200 can be punctured, while under vacuum, to release any gases before the battery cell 200 is resealed. At this point, the battery cell 200 is ready for operation and/or evaluation.

Figure 7:
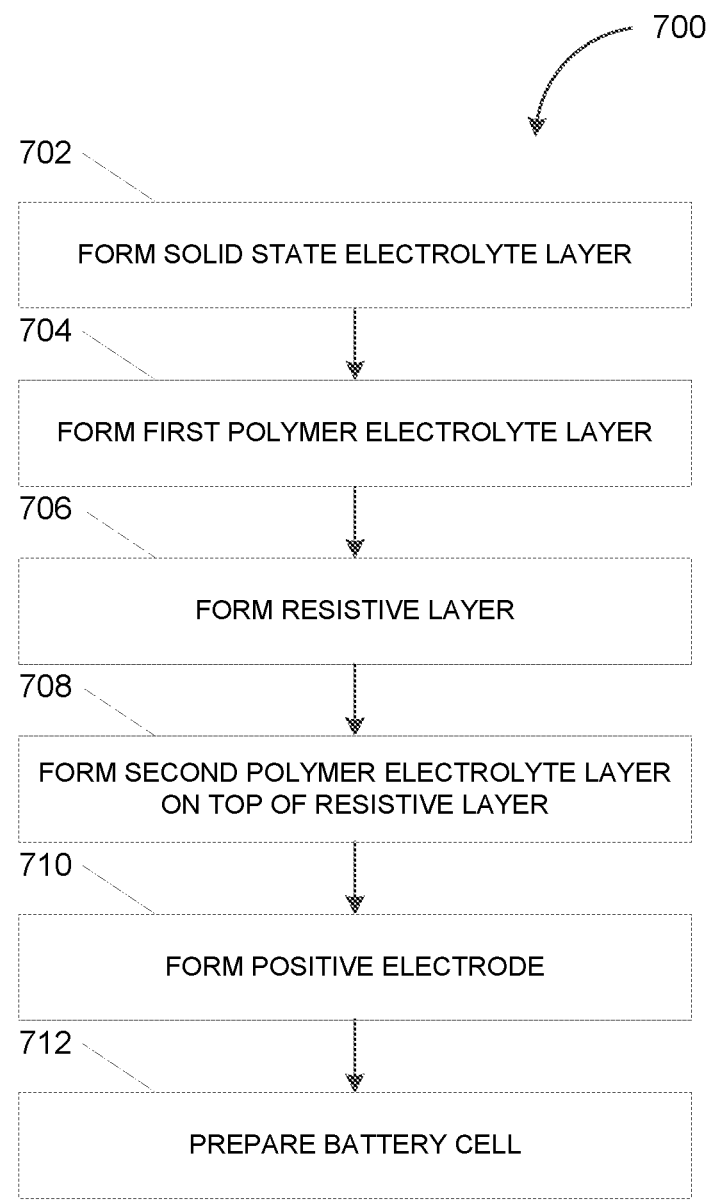
FIG. 7 depicts a flowchart illustrating a process for manufacturing a battery cell consistent with implementations of the current subject matter.

FIG. 7 depicts a flowchart illustrating a process 700 for manufacturing a battery cell consistent with implementations of the current subject matter. Referring to FIGS. 3 and 7, the process 700 can be performed to manufacture a battery cell such as, for example, the battery cell 300.

At 702, a solid state electrolyte layer can be formed. For example, the solid state electrolyte layer 310 of the battery cell 300 can be formed, for example, by vapor deposition and/or plasma deposition. In some implementations of the subject matter, forming the solid state electrolyte layer 310 can include dissolving, using a high speed mixer, 5 grams of polyethylene oxide (PEO) with 1,000,000 molecular weight into approximately 100 grams of deionized water, thereby forming a polyethylene oxide aqueous solution. Furthermore, 1 gram of lithium nitrate can be mixed into the polyethylene oxide aqueous solution followed by 20 grams of $Li_7La_3Zr_2O_{12}$ (LLZO). The resulting slurry can be coated onto the base film layer 330. The base film layer 330 can be a separator such as, for example, Celgard® 2300 and/or the like. Here, an automatic coating machine can be used to deposit an approximately 20 microns thick coating of the slurry onto the separator at 0.1 meter per minute. The coating of slurry can further be dried using the automatic coating machine with a first heating zone set to 60° C. and a second heating zone set to 80° C.

At 704, a first polymer electrolyte layer can be formed. For example, the first polymer electrolyte layer 320A of the battery cell 300 can be formed. In some implementations of the current subject matter, forming the first polymer electrolyte layer 320 can include dissolving, using a high speed mixer, 5 grams of polyethylene oxide (PEO) with 500,000 molecular weight into approximately 50 grams of deionized water, thereby forming a polyethylene oxide aqueous solution. Furthermore, 1 gram of lithium nitrate can be mixed into the polyethylene oxide aqueous solution. The solution can be coated onto the solid state electrolyte layer 310 formed at operation 702. For instance, the coating can be performed using an automatic coating machine at 0.1 meter per minute. This coating of slurry can further be dried using the automatic coating machine with a first heating zone set to 60° C. and a second heating zone set to 80° C. It should be appreciated that the resulting first polymer electrolyte layer 320A will interface directly with the negative first electrode 350A (e.g., anode) of the battery cell 300.

At 706, a resistive layer can be formed on top of a base film layer. For example, the resistive layer 340 can be formed on top of the base film layer 330. In some implementations of the current subject matter, forming the resistive layer 340 can include dissolving 10 grams of polyvinylidene fluoride (PVDF) LBG-1 into 100 grams of acetone and 20 grams of N-methylpyrrolidone (NMP). Furthermore, 0.5 grams of carbon black can be added to the mixture and mixed for 15 minutes at 6500 revolutions per minute. A flowable slurry can be formed by adding 1 grams of a lithium salt (e.g., lithium imide) and mixing for 30 minutes at 6500 revolutions per minute. Additional N-methylpyrrolidone (NMP) may be added to adjust the viscosity of the flowable slurry. This resulting slurry can be coated, using an automatic coating machine, onto one side of the base film layer 330 (e.g., Celgard® 2300) with the solid state electrolyte layer 310 being disposed on the opposite side of the base film layer 330. The automatic coating machine can further be used to dry this coating of slurry with a first heat zone set to approximately 60° C. and a second heat zone set to approximately 80° C. It should be appreciated that the slurry is subjected to heat in order to evaporate off the acetone and the N-methylpyrrolidone (NMP) in the slurry. The final dried resistive layer 340 can have a loading of approximately 2 milligrams per square centimeter.

At 708, a second polymer electrolyte layer can be formed on top of the resistive layer. For example, the second polymer electrolyte layer 320B of the battery cell 300 can be formed on top of the resistive layer 340. In some implementations of the current subject matter, forming the second polymer electrolyte layer 320B can include dissolving, using a high speed mixer, 5 grams of polyethylene oxide (PEO) with 500,000 molecular weight into approximately 50 grams of deionized water, thereby forming a polyethylene oxide aqueous solution. Furthermore, 1 gram of lithium nitrate can be mixed into the polyethylene oxide aqueous solution. The solution can be coated onto one side of the resistive layer 340 formed at operation 706, opposite from the base film layer 330. For instance, the coating can be performed using an automatic coating machine at 0.1 meter per minute. This coating of slurry can further be dried using the automatic coating machine with a first heating zone set to 60° C. and a second heating zone set to 80° C. It should be appreciated that the resulting second polymer electrolyte layer 320B will interface directly with the positive second electrode 350B (e.g., cathode) of the battery cell 300.

At 710, a positive electrode can be formed. For example, the second electrode 350B of the battery cell 300 can be formed. In some implementations of the current subject matter, forming the second electrode 250B can include dissolving 10.5 grams of polyvinylidene fluoride (PVDF) into 120 grams of N-methylpyrrolidone (NMP). Furthermore, 9 grams of carbon black can be added to the mixture and mixed for 15 minutes at 6500 revolutions per minute (rpm). A flowable slurry can subsequently be formed by adding 280 grams of $LiNi_{0.5}Mn_{0.3}Co_{0.2}O_2$ (NMC) (280 g) to the mixture and mixing for 30 minutes at 6500 revolutions per minute. Additional N-methylpyrrolidone (NMP) can be added to adjust the viscosity of the slurry. The resulting slurry can be coated onto a 15 micron thick layer of aluminum foil using an automatic coating machine. This coating of slurry can further be dried using the automatic coating machine with a first heat zone set to approximately 80° C. and a second heat zone set to approximately 130° C. It should be appreciated that subjecting the slurry to heat can evaporate the N-methylpyrrolidone (NMP) in the slurry. The final dried second electrode 350B can have a loading of approximately 15.55 milligrams per square centimeter (mg/cm$^2$). The second electrode 350B can further be compressed to a thickness of approximately 117 microns.

At 712, a battery cell can be prepared. For example, the battery cell 300 can be formed. In some implementations of the current subject matter, forming the battery cell 300 can include using an electrode tab to punch out the pieces forming the first electrode 350A and/or the second electrode 350B. The second electrode 350B (e.g., positive electrode) can be dried at 125° C. for 10 hours. Furthermore, the first electrode 350A and the second electrode 350B can be laminated, in a dry room, with the solid state electrolyte layer 310 interposed between the first electrode 350A, the first polymer electrolyte layer 320A, the base film layer 330, the resistive layer 340, the second polymer electrolyte layer 320B, and the second electrode 350B. It should be appreciated that in the resulting jelly-flat, the first polymer electrolyte layer 320A will directly interface with the first electrode 350A while the second polymer electrolyte layer 320B will interface directly with the second electrode 350B. Meanwhile, the base film layer 330 is interposed between the solid state electrolyte layer 310 and the resistive layer 340. This jelly-flat can be inserted into an aluminum (Al) composite bag, which is subsequently filled with a limited quantity of a liquid electrolyte such as, for example, a LiPF$_6$ based organic carbonate electrolyte. The aluminum composite bag can be sealed at 190° C. to form the battery cell 300. The battery cell 300 can be aged at 45° C. for 5 hours before being subject to an initial charge and discharge cycle. For instance, the sealed battery cell 300 can be first charged to 4.2V at a C/20 rate for 5 hours and then to 4.2V at 0.2 C rate for 5 hours before the battery cell 300 is rested for 20 minutes. The rested battery cell 300 can subsequently be discharged to 2.8V at 0.2 C rate. In addition, the battery cell 300 can be punctured, while under vacuum, to release any gases before the battery cell 300 is resealed. At this point, the battery cell 300 is ready for operation and/or evaluation.

Implementations of the current subject matter can include, but are not limited to, articles of manufacture (e.g. apparatuses, systems, etc.), methods of making or use, compositions of matter, or the like consistent with the descriptions provided herein.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the processes depicted in the accompanying figures and/or described herein do not necessarily require the operations to be performed in the order shown, or in any sequential order, in order to achieve desirable results. For example, one or more operations from these processes may be repeated and/or omitted. Other implementations may be within the scope of the following claim.

What is claimed is:

1. A battery cell, comprising:
    a solid state electrolyte layer interposed between a first electrode and a second electrode; and
    a resistive layer interposed between the first electrode and the second electrode, the resistive layer being ionically conductivity to enable a transfer of ions between the first electrode and the second electrode, and the resistive layer further being electrically conductive to regulate an internal current flow resulting from an internal short circuit formed from the solid state electrolyte layer being penetrated by metal dendrites formed at the first electrode and/or the second electrode.

2. The battery cell of claim 1, wherein the resistive layer comprises one or more electrically conductive materials, and wherein an amperage of the internal current flow is proportional to a quantity of the one or more electrically conductive material.

3. The battery cell of claim 2, wherein the one or more electrically conductive materials include carbon black, carbon nano tubes, graphene, conductive polymers, and/or conductive inorganic compounds.

4. The battery cell of claim 1, wherein the resistive layer comprises one or more ionically conductive materials, and wherein a power of the battery cell is directly proportional to a quantity of the one or more ionically conductive material.

5. The battery cell of claim 4, wherein the one or more ionically conductive materials include a polymer electrolyte, a polymer gel electrolyte, and/or a solid state electrolyte.

6. The battery cell of claim 1, wherein the resistive layer comprises one or more polymer binders.

7. The battery cell of claim 6, wherein the one or more polymer binders include a polyvinylidene fluoride (PVDF), a styrene-butadiene (SBR), a carboxymethyl cellulose (CMC), a polyimide, a polyamide, and/or a polyethylene.

8. The battery cell of claim 1, wherein the resistive layer comprises one or more nano-particle fillers.

9. The battery cell of claim 8, wherein the one or more nano-particle fillers include a calcium carbonate ($CaCO_3$), a silicon titanium oxide ($SiTiO_3$), an aluminum oxide ($Al_2O_3$), and/or a fumed silica.

10. The battery cell of claim 1, wherein the resistive layer comprises one or more electrochemically active compounds.

11. The battery cell of claim 10, wherein the one or more electrochemically active compounds include lithium nickel cobalt (NCM), lithium iron fluorine oxide ($LiFeFO_2$), iron fluoride ($FeF_x/C$), and/or lithium nickel manganese cobalt oxide (NMC).

12. The battery cell of claim 1, wherein the resistive layer is interposed between the solid state electrolyte layer and one of the first electrode and the second electrode.

13. The battery cell of claim 1, further comprising:
a first polymer electrolyte layer, the first polymer electrolyte layer interposed between the first electrode and the solid state electrolyte layer, the first polymer electrolyte layer being configured to reduce a contact impedance between the first electrode and the solid state electrolyte layer.

14. The battery cell of 13, further comprising:
a second polymer electrolyte layer, the second polymer electrolyte layer being interposed between the resistive layer and the second electrode.

15. The battery cell of claim 13, further comprising:
a base film layer, the solid state electrolyte layer being interposed between the first polymer electrolyte layer and the base film layer, the first polymer electrolyte layer and the base film layer being configured to prevent a decomposition of the solid state electrolyte layer during a production and/or an operation of the battery cell.

16. The battery cell of claim 1, wherein the battery cell comprises a metal battery.

17. The battery cell of claim 16, wherein the metal battery comprises a lithium (Li) battery, a sodium (Na) battery, and/or a potassium (K) battery.

18. The battery cell of claim 1, wherein the solid state electrolyte layer is formed by vapor deposition and/or plasma deposition.

19. The battery cell of claim 1, further comprising the first electrode and the second electrode.

20. The battery cell of claim 19, wherein the first electrode comprises a negative electrode, and wherein the second electrode comprises a positive electrode formed from a lithium nickel cobalt (NCM), lithium iron fluorine oxide ($LiFeFO_2$), and/or lithium nickel manganese cobalt oxide (NMC).

* * * * *